United States Patent [19]
Vartanian et al.

[11] Patent Number: 5,059,494
[45] Date of Patent: Oct. 22, 1991

[54] FUEL CELL POWER PLANT

[75] Inventors: George Vartanian, Ellington; Michael B. Landau, West Hartford, both of Conn.

[73] Assignee: International Fuel Cells, South Windsor, Conn.

[21] Appl. No.: 521,480

[22] Filed: May 10, 1990

[51] Int. Cl.⁵ .............................................. H01M 8/04
[52] U.S. Cl. ......................................... 429/17; 429/25
[58] Field of Search ................................... 429/25, 17

[56] References Cited
FOREIGN PATENT DOCUMENTS
521480 8/1985 Japan ...................................... 429/17

Primary Examiner—Stephen J. Kalafut
Attorney, Agent, or Firm—Edward L. Kochey, Jr.

[57] ABSTRACT

Pressure differential 6 between cathode 2 and anode 3 is controlled by valve 24, 26 of valve complex 20. The complex 20 is located within anode recirculation loop 8, 9, 3, 20 whereby controllability is not lost with no flow through the anode. Control is thereby retained during nitrogen purging of the cathode.

An orifice 22 in the valve complex 20 precludes accidental full closure of the complex, and is selected to avoid immediate damage to the fuel cell on such closure.

5 Claims, 3 Drawing Sheets

FUEL CELL POWER PLANT

DESCRIPTION

1. Technical Field

This invention relates to a power plant using a fuel cell and more particularly to the fuel cell limiting the pressure difference between the anode and cathode sides of the cells.

2. Background of the Invention

In a fuel cell, the electrolyte between the anode and cathode is formed thin normally so that an internal resistance of the cell is small.

For this reason, when a cell cross differential pressure between the anode and the cathode becomes high, fuel supplied to the anode or air supplied to the cathode passes said electrolyte while not subject to an electrochemical reaction, thus causing so-called crossover phenomena and resulting in the deterioration of cell performance or partial fracture. While the long term tolerable pressure differential is in the order of 5 cm of water, a higher differential can briefly be tolerated as a time related function. For instance, 200 cm of water may be tolerated for 1 second or 25 cm for 10 seconds.

A conventional fuel cell plant known in the prior is shown in FIG. 3. Air from line 10 passes through flow control value 11 to cathode 2 of fuel cell 1. Discharge from the cathode passes through separator 12 where water is removed 14. The air continues through line 13 to burner 15 of reformer 16.

Fuel from line 4 passes through flow control valve 5 to anode 3 of fuel cell 1. Residual fuel passes to burner 15 in reformer 16 for combustion. Blower 8 operates in recirculation line 9 increasing the flow through the anode to improve flow distribution.

Pressure difference sensor 6 detects the cross cell pressure differential. Controller 6A operates valve 7 in the anode discharge line to maintain the desired pressure differential.

During normal operation anode exhaust fuel and cathode exhaust air are supplied to a reformer burner while firing them in the reformer At this time, pressures of the anode exhaust fuel and cathode exhaust air become equal in a burner combustion chamber. The number of devices installed in the cathode exhaust air line is normally larger than in the anode exhaust fuel line (for example, heat exchanger in the air line).

Therefore, a pressure loss in the cathode exhaust air line becomes larger than that in the anode exhaust fuel line and there is a possibility that an untolerably large cathode to anode over-pressure may be caused in steady state or transient operation.

Therefore, a control valve 7 in the anode exhaust fuel line maintains a cell cross differential pressure within an allowable range. In a normal operation state, there is always a gas flow in the anode exhaust fuel side. With the pressure in each of the cathode and anode flow lines pegged at the burner this control valve may be modulated to affect the anode side pressure level. This pressure difference across the control valve is controlled to maintain the desired cell cross differential pressure.

On the other hand, in a process for plant shutdown, the air flow control valve is closed while purging the cathode with a nitrogen flow 18. At the same time, the fuel flow control valve 5 is also closed, resulting in no fuel being supplied to the burner through the anode.

However, with such a fuel cell power plant, no gas flows in the anode exit line when the cathode exhaust gas line is purged with nitrogen, and with the fuel supply valve shut off. Therefore, no suitable pressure difference is created across the valve no matter how the cell cross differential pressure control valve is controlled. Consequently, the function of cell cross differential pressure adjustment is no longer effective. As a result, an excess cell cross differential pressure causes deterioration of cell performance and fracture in part, as a fatal problem.

In such a flow scheme where the cell cross differential pressure control valve comprises only a single control valve, there is a problem when cell cross differential pressure control becomes impossible on failure of the control valve either fully open or fully closed.

SUMMARY OF THE INVENTION

In order to achieve the object described above according to the present invention, a cell cross differential pressure control valve is installed in the line between the anode exit and the branch point of the anode recycle line. This anode recycle is used to improve fuel distribution among the anodes. When purging nitrogen begins, the recycle blower is operated to create a gas flow in the anode recycle line. Thus, with this location of the control valve a suitable differential pressure is produced across the valve and the pressure may be controlled. In the result, cell cross differential pressure control is accomplished even during purge operation The control valve arrangement which maintains the pressure differential across the cell include an always open minimum flow path and preferably two parallel valves operating at the mid-position. The minimum opening limits pressure escalation if the valves fail closed. The dual valves provide continued operability in the event of failure of one of the valves.

DESCRIPTION OF THE PREFERRED EMBODIMENT

Figure 1:
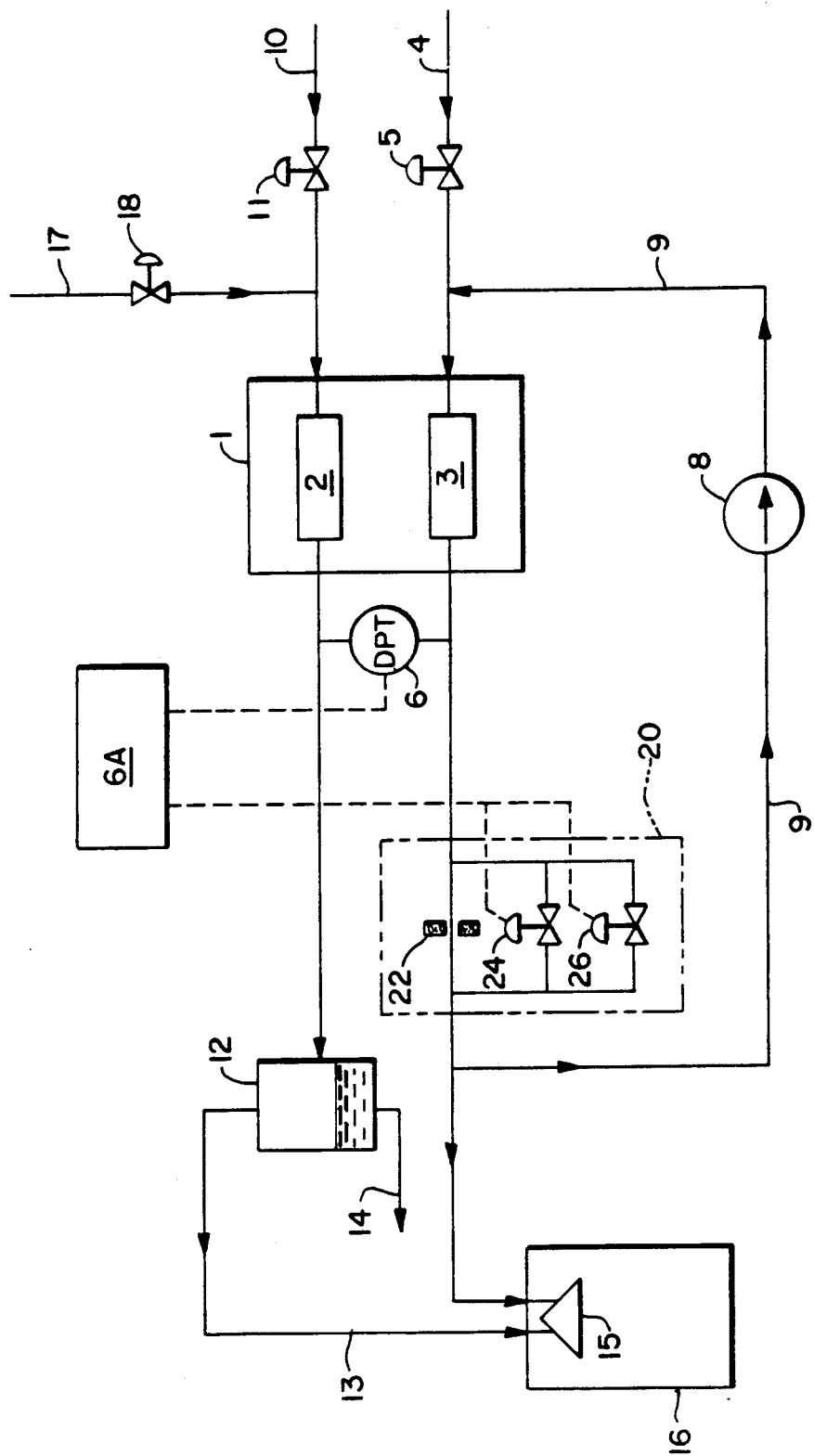
FIG. 1 is the process flow diagram for showing an embodiment according to the present invention.
Figure 3:
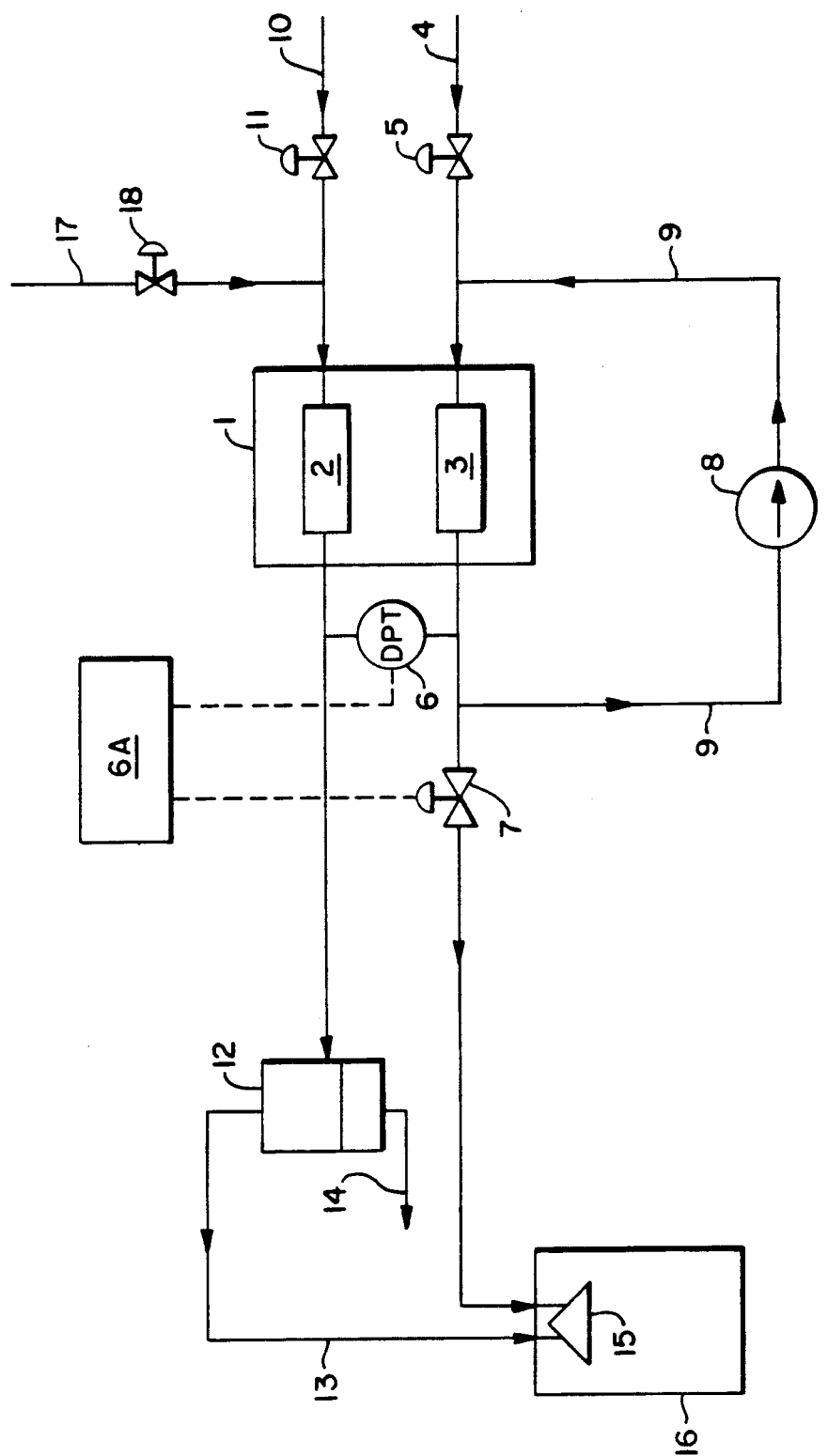
FIG. 3 shows the process flow diagram for a conventional fuel cell power plant known in the prior art.

FIG. 1 shows an example of preferred flow scheme for a fuel cell power plant according to the invention. The same reference numerals are used for the same portions as FIG. 3, while omitting detailed descriptions.

With this embodiment, valve complex 20, similar to cell cross pressure control valve 7, is installed in an anode recycle loop by locating it between the anode and the takeoff for the recirculating line 9.

When the plant is on load operation, fuel and air are supplied to the anode and the cathode by a fuel flow control valve 5 and an air flow control valve 11, respectively. Gases, leaving the anode and the cathode, are supplied separately to a burner 15 and used as a heat source for the fuel reforming reaction. It is the same operation as the flow scheme of a fuel cell plant shown in FIG. 3 in that the signal of a differential pressure transmitter 6 is transferred to a controller 6A from which a suitable valve opening signal is given to the cell cross pressure control valve 7.

When the plant is shutdown, and a nitrogen purge flow is to be passed through the cathode, the anode recirculation blower 8 is operated to produce a gas flow in the anode recycle line. Since the cell cross pressure control valve complex 20 is installed in the recirculation loop, the pressure level in the anode above the burner pressure may be modulated. An anode-to-cathode pressure differential can therefore be controlled As a result, the occurrence of excess cell cross differential pressure onto the cell itself can be effectively prevented, while enabling purging during shut down without cell performance deterioration or fracture The valve complex 20 is comprised of an orifice 22 in parallel with control valves 24 and 26. In the prior art arrangement there was always the possibility that the control valve would malfunction in the closed position resulting in a rapid escalation of the anode pressure. With a fixed opening in the line provided by the orifice, the pressure escalation will be limited because of the flow and pressure drop through the orifice. Since the flows through the anode line and the cathode line are normally in a substantially constant ratio, it might theoretically be possible to size the orifice to maintain the pressure drop in both lines. This, however, is not practical since the flows are not always completely proportional and transient operation must be considered. If the orifice were sized at the limit, there would be no way to increase the pressure drop in that line. Since, however, a higher than normal pressure difference may be accepted across the fuel cell electrolyte membrane for a short period of time the orifice may be selected based on the higher differential. This will not permit continued operation in the event of a valve closure, but it will avoid immediate damage, providing time to trip the plant or take other remedial action This use of an orifice in parallel with control valves has utility even with the prior art anode recirculation location. It's use in combination with the new anode recirculation location provides a further advantage, however Should the orifice be selected such that at some operating condition insufficient pressure drop exists across the orifice, the recirculation line may be activated providing increased pressure drop across the orifice.

Valves 24 and 26 located in parallel with the orifice are the valves which are modulated by controller 6A to maintain the cross cell pressure difference. These are selected to operate in the mid range and preferably selected so that if either valve is full open or full closed, the other valve can continue to control the pressure within the desired range. Again, further control is possible by electing whether or not to operate blower 86 and effect recycle with flow passing through the control valve complex.

Figure 2:
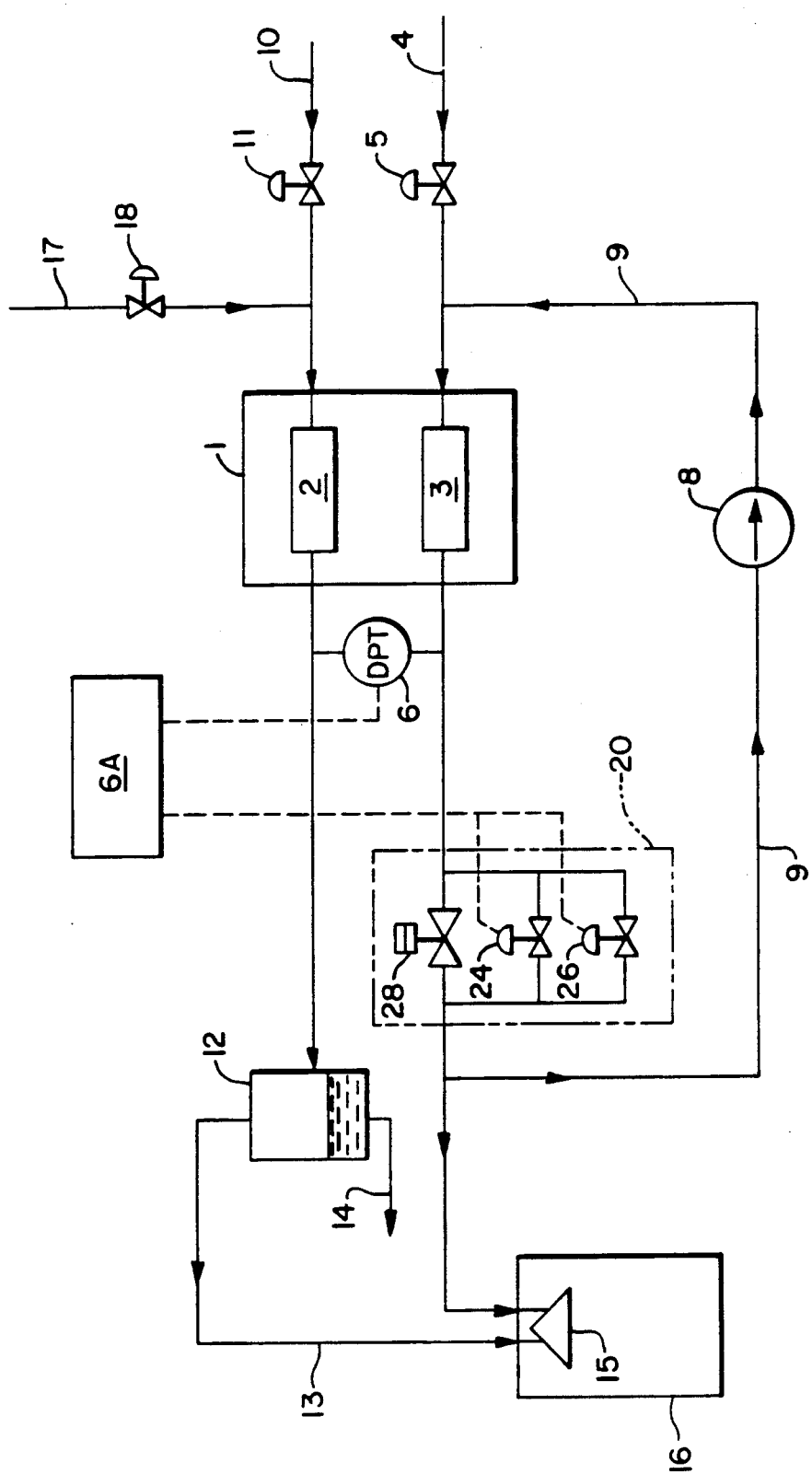
FIG. 2 is the process flow diagram for showing another embodiment of the invention.

Further flexibility is achieved in the embodiment illustrated in FIG. 2. In the valve complex 20 the multiposition valve 28 is substituted for orifice 22. This valve preferably is not fully closable, but may be set at any one of a plurality of openings. This is the equivalent of the orifice, except that the orifice may be changed by selecting the valve position This permits the particular orifice selection to be more closely adjusted to the operating load condition of the plant by manually or automatically selecting various equivalent orifice sizes as a function of the load.

Accordingly, the cell cross pressure control of the prior art is achieved without danger of immediate damage in the event of a closed valve failure of the control valve. Furthermore, the ability to maintain pressure differential across the electrolyte membrane is achieved during nitrogen purging with the plant shut down.

We claim:

1. In a fuel cell power plant including a fuel cell stack containing a fuel cells, each having an anode and a cathode, an anode recirculation line for returning at least a part of anode exhaust gas via an anode recycle blower to the anode inlet, a differential pressure transmitter for measuring a differential pressure between the anode and the cathode, a cell cross pressure control valve complex comprising a control valve and either an orifice or a fixed opening throttle valve with said control valve in parallel with said orifice or throttle valve, and a controller for controlling a degree of opening of said cell cross pressure control valve according to a measured value of said differential pressure transmitter, the fuel cell power plant characterized in that said cell cross pressure control valve complex is installed in the line between the anode outlet and a branch point of said anode recirculation line from the anode outlet line.

2. A fuel cell as in claim 1 comprising at least two control valves in parallel with said orifice or throttle valve.

3. A fuel cell power plant as in claim 1, wherein said fixed opening throttle valve is adjustable to at least two different openings.

4. In a fuel cell power plant including a fuel cell stack containing fuel cells, each having an anode and a cathode, an anode recirculation line for returning at least a part of anode exhaust gas via an anode recycle blower to the anode inlet, a differential pressure transmitter for measuring a differential pressure between the anode and the cathode, a cell cross pressure control valve complex, and a controller for controlling a degree of opening of said cell cross pressure control valve according to a measured value of said differential pressure transmitter, the fuel cell power plant characterized in that said cell cross pressure control valve complex comprises a control valve and either an orifice or a fixed opening throttle valve, and said control valve is in parallel with said orifice or throttle valve.

5. A fuel cell as in claim 4 comprising at least two control valves in parallel with said orifice or throttle valve.

* * * * *

UNITED STATES PATENT AND TRADEMARK OFFICE
CERTIFICATE OF CORRECTION

PATENT NO. : 5,059,494

DATED : October 22, 1991

INVENTOR(S) : George Vartanian, Michael B. Landau

It is certified that error appears in the above-identified patent and that said Letters Patent is hereby corrected as shown below:

Column 1, Claim 1, Line 16 after "containing" delete "a"

Signed and Sealed this

Fifteenth Day of June, 1993

Attest:

MICHAEL K. KIRK

Attesting Officer

Acting Commissioner of Patents and Trademarks